United States Patent
Tsukada et al.

(10) Patent No.: US 7,556,704 B2
(45) Date of Patent: Jul. 7, 2009

(54) PNEUMATIC TIRE AND MANUFACTURING METHOD THEREOF

(75) Inventors: Shuichi Tsukada, Hiratsuka (JP); Hiroshi Yamauchi, Toyota (JP); Yasuji Akiyoshi, Nagoya (JP)

(73) Assignees: The Yokohama Rubber Co., Ltd., Tokyo (JP); Mitsubishi Jidosha Kogyo Kabushiki Kaisha, Tokyo (JP)

( * ) Notice: Subject to any disclaimer, the term of this patent is extended or adjusted under 35 U.S.C. 154(b) by 828 days.

(21) Appl. No.: 10/806,209

(22) Filed: Mar. 23, 2004

(65) Prior Publication Data

US 2004/0206440 A1 Oct. 21, 2004

(30) Foreign Application Priority Data

Mar. 25, 2003 (JP) ............................. 2003-081754

(51) Int. Cl.
*B29D 30/00* (2006.01)
*B60C 15/00* (2006.01)
(52) U.S. Cl. .................. 156/110.1; 156/123; 152/539
(58) Field of Classification Search ............ 152/539, 152/541, 543; 156/123
See application file for complete search history.

(56) References Cited

U.S. PATENT DOCUMENTS 4,034,792 A * 7/1977 Martin .................. 152/379.3
4,343,342 A * 8/1982 McDonald .............. 152/523
6,418,993 B1 * 7/2002 Sakamoto et al. ........... 152/539
6,536,368 B2 * 3/2003 Hendrie ................... 116/34 A

FOREIGN PATENT DOCUMENTS

| JP | 02106330 | * | 4/1990 |
| JP | 03193510 | * | 8/1991 |
| JP | 11170824 | * | 6/1999 |
| JP | 2001-113902 A1 | | 4/2001 |

OTHER PUBLICATIONS

Machine Translation of JP 2001-113902.*
Machine Translation of JP 2001-113902. (published in 2001).*

* cited by examiner

*Primary Examiner*—Justin Fischer
(74) *Attorney, Agent, or Firm*—Greer, Burns & Crain, Ltd.

(57) ABSTRACT

A method for manufacturing a pneumatic tire, including the steps of intermittently crimping volume adjusting members on both side sections of a sheet inner liner material in a longitudinal direction thereof beforehand, winding the inner liner material on an outer peripheral side of a forming drum, winding a sheet carcass material on an outer peripheral side of the inner liner material, forming an unvulcanized tire containing the inner liner material and the carcass material, and vulcanizing the unvulcanized tire. The volume adjusting members are intermittently arranged in a tire circumferential direction between the inner liner material and the carcass material.

3 Claims, 3 Drawing Sheets

PNEUMATIC TIRE AND MANUFACTURING METHOD THEREOF

BACKGROUND OF THE INVENTION

The present invention relates to a pneumatic tire in which a sectional shape of a closed space formed between a tire and a wheel is changed in a tire circumferential direction, and a manufacturing method thereof. More particularly, the present invention relates to a pneumatic tire designed to solve problems which occur when a sectional shape of a closed space is changed in a tire circumferential direction, and a manufacturing method thereof.

As countermeasures against noise caused by air column resonance of an automobile wheel, there has been proposed a technique for shortening resonance time at a single frequency by changing a sectional shape of a closed space formed between a pneumatic tire and a wheel in a tire circumferential direction to reduce noise caused by the air column resonance (e.g., Japanese Patent Application Laid-Open No. 2001-113902). Especially, when a proper member is fixed to a tire inner surface in a bead portion of the pneumatic tire, the air column resonance can be reduced while unbalance caused by weight or rigidity of the member is minimized.

However, if a member for changing the sectional shape of the closed space is stuck to the tire inner surface in the bead portion, cracks easily occur from ends of the member. Consequently, there is a problem that durability of the tire is reduced. Additionally, in the technique for sticking the member to the tire inner surface in the bead portion, there is an adverse effect of a considerable reduction in tire productivity.

SUMMARY OF THE INVENTION

An object of the present invention is to provide a pneumatic tire which enables improvement of durability when a sectional shape of a closed space is changed in a tire circumferential direction by adding a member to a bead portion.

Another object of the present invention is to provide a method for manufacturing a pneumatic tire, which enables improvement of productivity when a sectional shape of a closed space is changed in a tire circumferential direction by adding a member to a bead portion.

In order to achieve the object, a pneumatic tire of the present invention in which a carcass layer is arranged between a pair of left and right bead portions and an inner liner layer is provided on an inner side of the carcass layer, is characterized in that volume adjusting members are intermittently arranged between the carcass layer and the inner layer in the bead portions in a tire circumferential direction so as to change a sectional shape of a closed space formed between the tire and a wheel in the tire circumferential direction.

By thus arranging the volume adjusting members between the carcass layer and the inner liner layer, ends of the volume adjusting members are prevented from being exposed to the tire inner surface, thereby suppressing generation of cracks from the ends. Accordingly, it is possible to improve durability of the tire. Additionally, since the volume adjusting members are intermittently arranged in the tire circumferential direction in the bead portions, it is possible to reduce air column resonance sound while unbalance caused by weight or rigidity of the volume adjusting members is minimized. Especially, the volume adjusting members are preferably arranged at equal intervals in the tire circumferential direction in order to suppress weight unbalance.

Meanwhile, in order to achieve the object, a method for manufacturing a pneumatic tire of the present invention is characterized by including the steps of: intermittently crimping volume adjusting members on both side sections of a sheet inner liner material in a longitudinal direction thereof beforehand; winding the inner liner material on an outer peripheral side of a forming drum; winding a sheet carcass material on an outer peripheral side of the inner liner material; forming an unvulcanized tire containing the inner liner material and the carcass material; and vulcanizing the unvulcanized tire.

Thus, it is possible to improve tire productivity by using the inner liner material on which the volume adjusting members are crimped beforehand. Especially, when the volume adjusting members are arranged between the inner liner material and the carcass material, it is possible to obtain a pneumatic tire which is provided with the volume adjusting members between the carcass layer and the inner liner layer in the bead portions and is excellent in durability.

DETAILED DESCRIPTION OF THE PREFERRED EMBODIMENT

Hereinafter, the constitution of the present invention will be described in detail with reference to the accompanying drawings.

Figure 1:
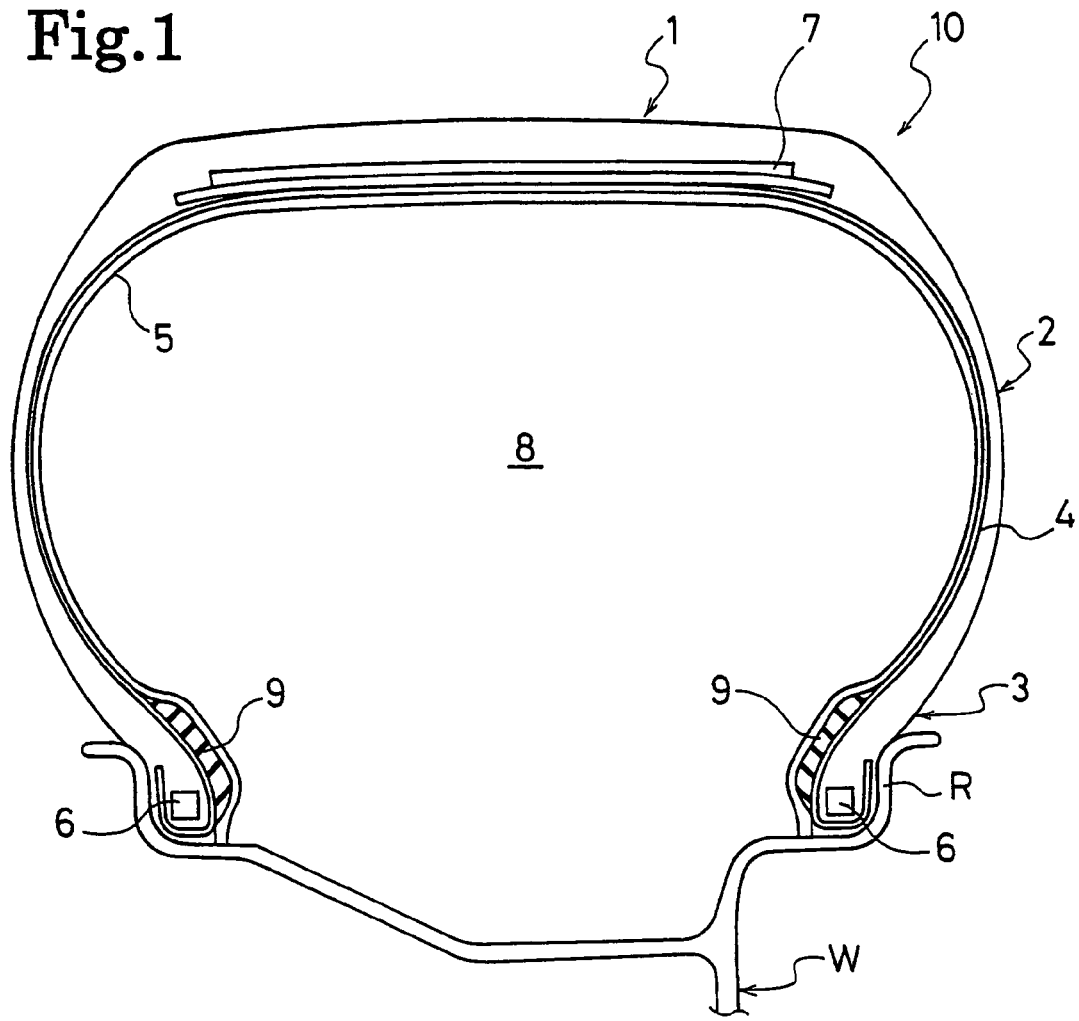
FIG. 1 is a meridian sectional view showing a pneumatic tire according to an embodiment of the present invention.
Figure 2:
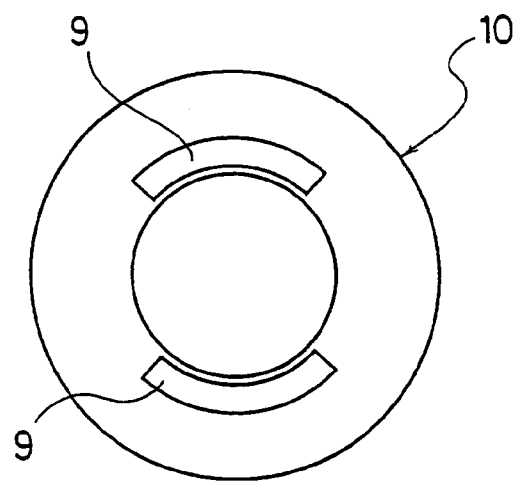
FIG. 2 is an explanatory view schematically showing a volume adjusting member arranged in a bead portion of the pneumatic tire of the present invention from a side of the tire.

FIG. 1 shows a pneumatic tire according to an embodiment of the present invention, and FIG. 2 schematically shows a volume adjusting member arranged in a bead portion of the pneumatic tire from a side of the tire. As shown in FIG. 1, a pneumatic tire 10 comprises a tread portion 1, sidewall portions 2, and bead portions 3. A carcass layer 4 is arranged between a pair of left and right bead portions 3,3, and an inner liner layer 5 is disposed on an inner side of the carcass layer 4. An end of the carcass layer 4 in a width direction is wound up from the inner side to the outer side of the tire around a bead core 6 in each bead 3. Additionally, in the tread portion 1, a belt layer 7 is embedded on an outer peripheral side of the carcass layer 4. The pneumatic tire 10 is fixed to a rim R of a wheel W, and a closed space 8 is formed between the pneumatic tire 10 and the wheel W.

In the pneumatic tire 10, a plurality of volume adjusting members 9 are embedded between the carcass layer 4 and the inner liner layer 5 in the bead portions 3 in order to change a sectional shape of the closed space 8 in a tire circumferential direction. As shown in FIG. 2, these volume adjusting members 9 are intermittently arranged in the tire circumferential direction. Additionally, the volume adjusting members 9 are arranged at equal intervals in the tire circumferential direction in order to suppress weight unbalance.

There is no particular limitation on materials for the volume adjusting members 9. Preferably, however, the members 9 are made of rubber compositions so that the volume adjusting members 9 hardly come off from the carcass layer 4 or the inner liner layer 5. It is preferred that the volume adjusting members 9 be set in a range from 1 mm to 10 mm in thickness.

If a thickness is lower than 1 mm, a reduction effect of air column resonance sound becomes unsatisfactory. If a thickness exceeds 10 mm, there is a possibility that uniformity is deteriorated.

As described above, the volume adjusting members 9 are intermittently arranged in the tire circumferential direction to change the sectional shape of the closed space 8 in the tire circumferential direction. Thus, an air column resonance frequency of the closed space 8 is changed with rotation of the wheel, thereby reducing air column resonance sound. Additionally, since the volume adjusting members 9 are arranged in the bead portions 3, instead of the tread portion 1, it is possible to minimize unbalance caused by weight or rigidity thereof. Moreover, since the volume adjusting members 9 are arranged between the carcass layer 4 and the inner liner layer 5 to prevent exposure of the ends thereof to the tire inner surface, generation of cracks from the ends of the volume adjusting members 9 can be suppressed to improve durability of the pneumatic tire 10.

Figure 3:
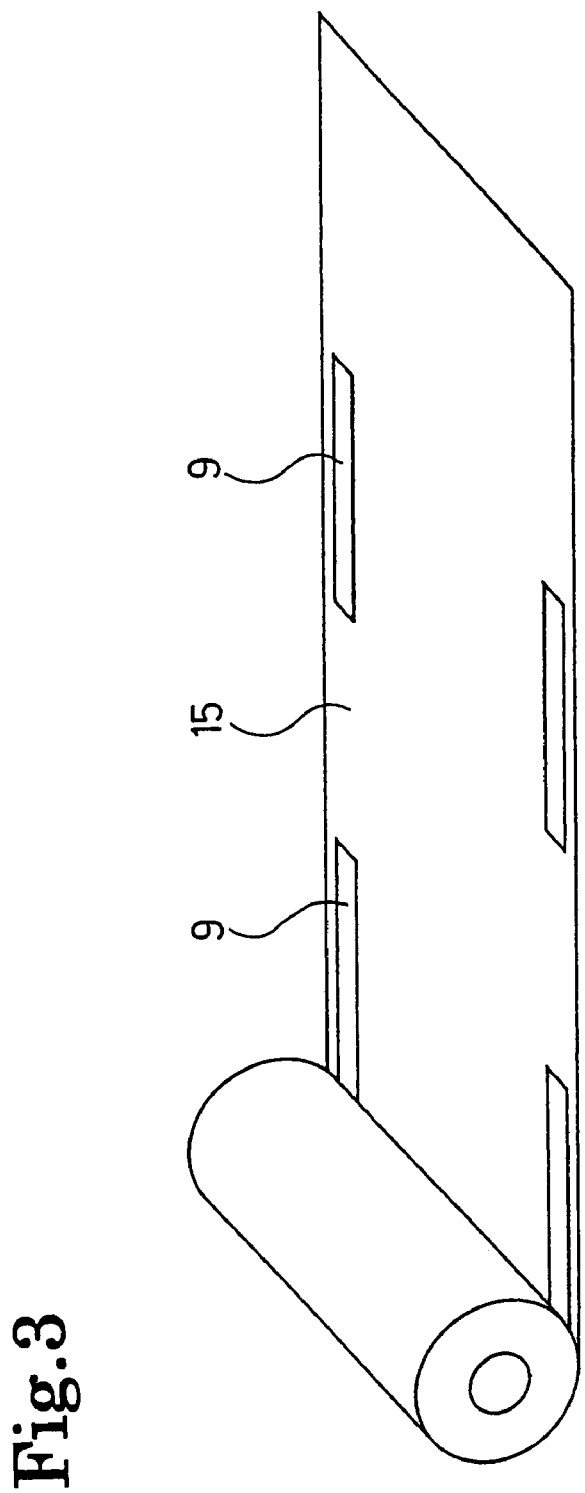
FIG. 3 is a perspective view showing an inner liner material fed to a forming drum.

Next, a method for manufacturing the pneumatic tire will be described. FIG. 3 shows an inner liner material fed to a forming drum. FIGS. 4(a) to 4(d) show steps of the pneumatic tire manufacturing method of the present invention.

According to the present invention, as shown in FIG. 3, the volume adjusting members 9 are intermittently crimped on both side sections of a sheet inner liner material 15 in a longitudinal direction thereof beforehand, and the inner liner material 15 having the volume adjusting members 9 is continuously fed to a forming drum. For example, when volume adjusting members 9 are arranged at two places on a tire circumference, arrangement and nonarrangement of volume adjusting members 9 are repeated for every ¼ of a forming drum circumference. Accordingly, no problems occur even when any places of the inner liner material 15 in the longitudinal direction are cut during tire forming.

Figure 4A:
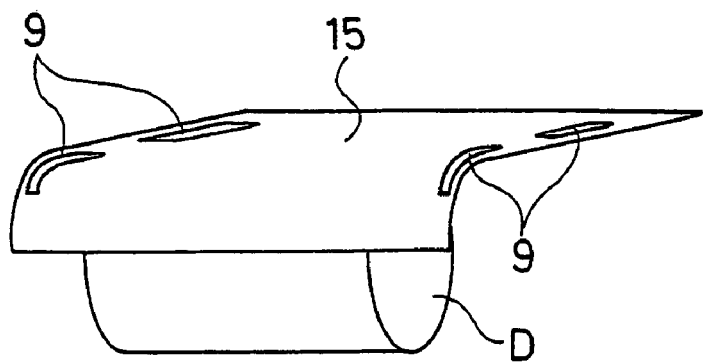
FIGS. 4(a) to 4(d) are perspective views showing steps of a method for manufacturing the pneumatic tire of the present invention.
Figure 4B:
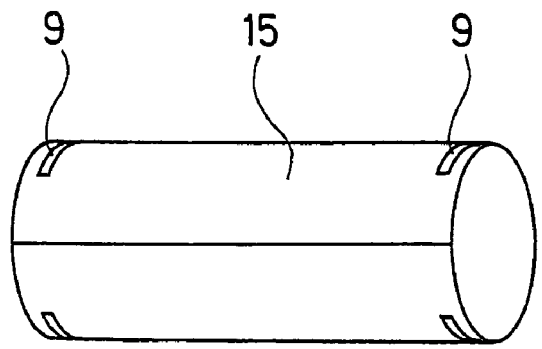
Figure 4C:
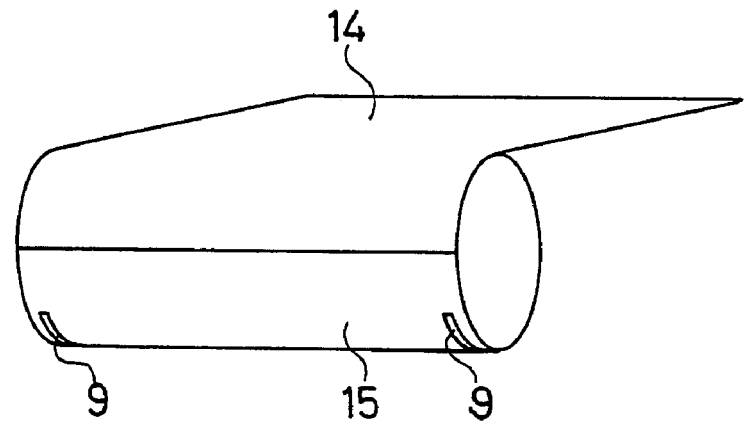
Figure 4D:
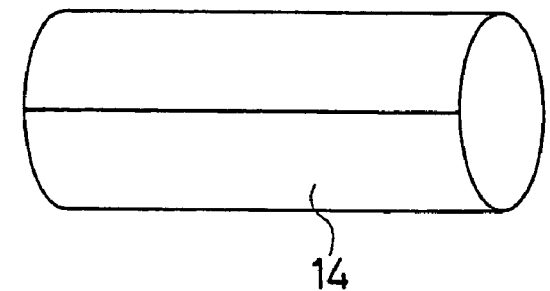

The inner liner material 15 prepared in the above manner is wound on an outer peripheral side of the forming drum D, and both ends thereof in a drum circumferential direction are spliced as shown in FIGS. 4(a) and 4(b). Then, as shown in FIGS. 4(c) and 4(d), a sheet carcass material 14 is wound on an outer peripheral side of the inner liner material 15, and both ends thereof in the drum circumferential direction are spliced. Thereafter, a member such as a bead core (not shown) is added to form an unvulcanized tire containing the carcass material 14 and the inner liner material 15. This unvulcanized tire is vulcanized in a mold by a normal vulcanizing process. Note that the carcass material 14 and the inner liner material 15 become the aforementioned carcass layer 4 and inner liner layer 5, respectively.

The use of the inner liner material 15 on which the volume adjusting members 9 are crimped beforehand as described above enables simple addition of the volume adjusting members 9 to the bead portions 3 of the pneumatic tire 10. Thus, it is possible to improve productivity of the pneumatic tire 10. Especially, when the volume adjusting members 9 are arranged between the carcass material 14 and the inner liner material 15, i.e., between the carcass layer 4 and the inner liner layer 5 at the bead portions 3, it is also possible to improve durability of the pneumatic tire 10.

The preferred embodiment of the present invention has been described in detail hereinbefore. However, it should be understood that various changes, modifications and substitutions can be made without departing from the spirit and scope of the invention defined in the appended claims.

EXAMPLE

Pneumatic tires of conventional examples 1 to 3 and the embodiment which were 185/70 R14 in tire size and different only in tire structure were manufactured. The conventional example 1 is a reference pneumatic tire. The conventional example 2 is a pneumatic tire in which volume adjusting members are intermittently stuck to a tire inner surface in a tread portion in a tire circumferential direction, and a sectional area changing rate of a closed space formed between the tire and a wheel is 2.0%. The conventional example 3 is a pneumatic tire in which volume adjusting members are intermittently stuck to a tire inner surface in bead portions in a tire circumferential direction, and a sectional area changing rate of a closed space formed between the tire and a wheel is 2.0%. Meanwhile, the embodiment is a pneumatic tire in which volume adjusting members are intermittently embedded between a carcass layer and an inner liner layer in bead portions in a tire circumferential direction, and a sectional area changing rate of a closed space formed between the tire and a wheel is 2.0%.

These four kinds of pneumatic tires were evaluated in terms of air column resonance sound, uniformity and durability by a measuring method below. The results are shown in Table 1.

Air Column Resonance Sound:

Each test tire was assembled to a wheel with a rim size 14×5·½ JJ, and air column resonance sound (dB) was measured by a microphone installed in a position at the driver's ear on a driver seat window side in a vehicle compartment when driving a passenger car of 1800 cc displacement on a rough road surface at a speed of 50 km/h with air pressure set to 220 kPa. Results of evaluation are represented by relative values while the conventional example 1 is set as a reference (±0.0). A positive value means larger air column resonance sound, and a negative value means smaller air column resonance sound.

Uniformity:

Each test tire was assembled to a wheel with a rim size 14×5·½ JJ, and tractive force variation (TFV) was measured at a speed of 100 km/h to compare secondary components thereof. Inverse numbers of the measured values were used in the evaluation, and results of evaluation were represented by indexes while the conventional example 1 was set to 100. A larger index value means better uniformity.

Durability:

Each test tire was assembled to a wheel with a rim size 14×5·½ JJ, a passenger car of 1800 cc displacement was driven in an urban area for 30000 km with air pressure set to 220 kPa, and a bonded state of volume adjusting members was investigated after the driving. The results of evaluation are represented by "A" where in there is no crack, "B" when there is a slight crack, or "C" when there is a large crack.

TABLE 1

|  | Conventional example 1 | Conventional example 2 | Conventional example 3 | Embodiment |
|---|---|---|---|---|
| Position of volume adjusting member |  | Tire inner surface of tread portion | Tire inner surface of bead portion | Inside bead portion |
| Air column resonance sound (dB) | ±0.0 | −3.0 | −3.0 | −3.0 |

TABLE 1-continued

|  | Conventional example 1 | Conventional example 2 | Conventional example 3 | Embodiment |
|---|---|---|---|---|
| Uniformity (index) | 100 | 80 | 100 | 100 |
| Durability | A | B | C | A |

As apparent from the Table 1, the pneumatic tire of the embodiment could obtain reduction effects of air column resonance sound without lowering uniformity or durability compared with the conventional example 1. Meanwhile, the conventional examples 2 and 3 have problems in uniformity or durability while they have reduction effects of air column resonance sound.

As described above, according to the pneumatic tire of the present invention, since the volume adjusting members are intermittently arranged between the carcass layer and the inner liner layer in the bead portions in the tire circumferential direction, it is possible to improve durability of the tire when the sectional shape of the closed space is changed in the tire circumferential direction by adding the members to the bead portions.

Furthermore, according to the pneumatic tire manufacturing method of the present invention, since the volume adjusting members are intermittently crimped on both side sections of the sheet inner liner material in the longitudinal direction thereof beforehand and the unvulcanized tire is formed by using the inner liner material, it is possible to improve productivity of the tire when the sectional shape of the closed space is changed in the tire circumferential direction by adding the members to the bead portions.

Thus, it is possible to reduce air column resonance sound while solving problems which occur when the sectional shape of the closed space is changed in the tire circumferential direction and minimizing unbalance caused by the weight or rigidity of the volume adjusting members.

What is claimed is:

1. A method for manufacturing a pneumatic tire, comprising the steps of:
    intermittently crimping volume adjusting members on both side sections of a sheet inner liner material in a longitudinal direction thereof beforehand;
    winding the inner liner material on an outer peripheral side of a forming drum;
    winding a sheet carcass material on an outer peripheral side of the inner liner material;
    forming an unvulcanized tire containing the inner liner material and the carcass material; and
    vulcanizing the unvulcanized tire,
    wherein the volume adjusting members are intermittently arranged in a tire circumferential direction between the inner material and the carcass material.

2. The method for manufacturing a pneumatic tire according to claim 1, wherein the volume adjusting members are made of rubber compositions and set in a range from 1 mm to 10 mm in thickness.

3. The method for manufacturing a pneumatic tire according to claim 1, wherein the volume adjusting members are arranged at equal intervals in the tire circumferential direction.

* * * * *